(12) United States Patent
Talbot et al.

(10) Patent No.: US 9,378,575 B1
(45) Date of Patent: Jun. 28, 2016

(54) CHAINED KINEMATIC LOGIC

(71) Applicant: Pixar, Emeryville, CA (US)

(72) Inventors: Jeremie Talbot, San Francisco, CA (US); Corey Revilla, San Francisco, CA (US)

(73) Assignee: Pixar, Emeryville, CA (US)

( * ) Notice: Subject to any disclaimer, the term of this patent is extended or adjusted under 35 U.S.C. 154(b) by 173 days.

(21) Appl. No.: 14/072,356

(22) Filed: Nov. 5, 2013

(51) Int. Cl.
*G06T 13/00* (2011.01)
*G06F 3/0481* (2013.01)
*G06T 13/40* (2011.01)

(52) U.S. Cl.
CPC ............. *G06T 13/00* (2013.01); *G06F 3/0481* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 5,755,620 A | 5/1998 | Yamamoto et al. | |
| 6,191,798 B1 * | 2/2001 | Handelman et al. | 345/473 |
| 6,307,554 B1 | 10/2001 | Arai et al. | |
| 6,441,816 B1 | 8/2002 | Nguyen et al. | |
| 6,700,586 B1 | 3/2004 | Demers | |
| 6,791,549 B2 | 9/2004 | Hubrecht et al. | |
| 6,798,415 B2 | 9/2004 | Lake et al. | |
| 7,070,277 B2 | 7/2006 | Trumbull | |
| 7,154,507 B1 | 12/2006 | Moreton et al. | |
| 7,206,827 B2 | 4/2007 | Viswanath et al. | |
| 7,227,526 B2 | 6/2007 | Hildreth et al. | |
| 7,545,378 B2 | 6/2009 | Russ et al. | |
| 7,898,522 B2 | 3/2011 | Hildreth et al. | |
| 7,928,985 B2 | 4/2011 | Goldfarb | |
| 8,095,200 B2 | 1/2012 | Quaid, III | |
| 8,358,311 B1 * | 1/2013 | Witkin | G06T 13/40 345/474 |
| 2002/0135591 A1 | 9/2002 | Zhang | |
| 2002/0150859 A1 | 10/2002 | Imgrund et al. | |
| 2004/0263518 A1 * | 12/2004 | Anderson | G06T 13/40 345/473 |
| 2005/0052714 A1 | 3/2005 | Klug et al. | |
| 2005/0253843 A1 | 11/2005 | Losasso Petterson et al. | |
| 2006/0139355 A1 | 6/2006 | Tak et al. | |
| 2006/0221076 A1 | 10/2006 | Takahashi et al. | |

(Continued)

FOREIGN PATENT DOCUMENTS

EP  1 353 518 A1  10/2013

OTHER PUBLICATIONS

Kallmann, "Kallmann_USC_NPL", 2005.*

(Continued)

*Primary Examiner* — Jennifer To
*Assistant Examiner* — Beau Spratt
(74) *Attorney, Agent, or Firm* — Kilpatrick Townsend & Stockton LLP

(57) ABSTRACT

A system and method of animating an object using chained kinematic logic is provided. An animated object may be comprised of several components, each having a corresponding solver. An animator may designate a final desired position of a primary component. The method further includes automatically determining a hierarchical chained relationship between the primary component and one or more secondary associated components. Using chained kinematic logic defined by constraints, the statuses of the solvers for the secondary components may change based on the statuses of the primary component's solver and final desired position. Thus, a pose of the entire object, including the states of all its associated secondary components, may change based on an updated status of the solver of the first component designated by the animator.

20 Claims, 8 Drawing Sheets

(56) References Cited

U.S. PATENT DOCUMENTS

| | | |
|---|---|---|
| 2006/0250402 A1 | 11/2006 | Perlin |
| 2009/0184967 A1 | 7/2009 | Kulas |
| 2010/0137882 A1 | 6/2010 | Quaid, III |

OTHER PUBLICATIONS

3DMAX—Tutorials, "IK Solver Rollout_NPL", 2010.*
Motion Boutique,, "motionboutique_NPL", 2013.*
Coepijn, et al., "Beginners Guide Maya", Jun. 2005, 15 pages.
Curti, S. et al.; "3D effect generation from monocular view"; 2002, Proceedings of the First International Symposium on 3D Data Processing Visualization and Transmission, 4 pages.
Milliron, T. et al., "Smart Cars: Driving the Characters in Cars," SIGGRAPH, Aug. 2006, 1 page.
Sumner et al. "Mesh-Based Inverse Kinematics". ACM 2005.
Tecchia et al., "Visualizing Crowds in Real-Time," Computer Graphics Forum, 2002, vol. 21, No. 4, pp. 753-765, Blackwell Publishers, Malden, MA.
Tzovaras, D. et al.; "Disparity field and depth map coding for multiview 3D image generation"; 1998, Signal Processing: Image Communication, vol. 11, pp. 205-230.
Weyand "Mesh-Based Inverse Kinematics". Nov. 16, 2005.
Zhang et al. "Spacetime Faces: High Resolution Capture for Modeling and Animation", published 2004.
U.S. Appl. No. 11/759,790, filed Jun. 7, 2007, 48 pages.
U.S. Appl. No. 12/248,860, filed Oct. 9, 2008, 18 pages.

* cited by examiner

CHAINED KINEMATIC LOGIC

BACKGROUND

Animation involves the generation of a series of still images that, when played back in quick succession, appear as continuously moving. In computer animation, a rendering process is used to generate a two-dimensional image of a three-dimensional scene from a given viewpoint. Animated sequences can be created by rendering a sequence of the rendered images of a scene as a scene is gradually changed over time. A great deal of effort has been devoted to making the rendered images and the resultant animation realistic.

In some instances, the animation of objects may be independent of the environment surrounding the objects being animated during an animation process. However, in certain situations, the animation of the object may depend on other objects in the environment, other objects it is connected to, or the animation of several parts of the object, in order to be positioned appropriately to increase the realism of the animation. For example, the animation of a character with appendages such as an arm on a table can include controlled animation of a shoulder, elbow, wrist, and fingers on the table surface such that when animated a physically realistic look is provided, e.g., not penetrating the table surface or having an awkward, unnatural angle in the elbow. The character also can react to changes in its environment or appendages. For example, the arm on the table can have a different position when the controlled character is sitting down compared to standing up. In a first state the character may be resting the arm on the table while sitting down in a chair at the table. Then, in a second state when the character stands up from the chair, the arm's position can change accordingly but the hand, or parts of the arm, may remain resting on the table.

Typically, the associated animation of objects or parts of objects is handled manually by the animator or user. For example, to move the character from a sitting position to a standing position, the animator manually and individually adjusts the movement and position of every component of the arm (including the shoulder, elbow, hand, and fingers) relative to the table surface and to the character's body such that the movement of the entire arm and character remains as realistic as possible. Such manual setting of objects or parts of objects can be tedious and time consuming for an animator. Therefore it is desirable to provide improved techniques that overcome the above and other problems.

BRIEF SUMMARY

Embodiments of the present invention relates generally to computer animation and graphics, and more particularly to techniques for determining a position of a component of an animated object relative to another component of the animated object. Animating an object may include various software and interfaces for manipulating positions of objects and their associated components. The animation software may utilize kinematic algorithms, including, but not limited to inverse kinematics and/or forward kinematics.

Objects (e.g., arms, legs, spine, etc.) may be linked together in a hierarchical chained manner to form a body. This linking establishes the chained hierarchy. In inverse kinematics (IK), to rotate an object (e.g., an arm), a first component of the object linked to it as an endpoint (e.g., hand) may have a particular position. In turn, based on the chained hierarchy, other associated components of the object (e.g., wrist, elbow) may have subsequent movements dependent on the position or movement of the first component. The association between the hand movement and the wrist and/or elbow movements may be based on chained logic representing the chained hierarchy. This is the essential principle of hierarchical motion. In forward kinematics (FK), rotating the arm involves, for example, the first component being a shoulder as a start point, and the associated components (e.g., elbow, wrist, and hand) follow based on the movement of the shoulder.

In some instances, to help animators deal with interactions between a plurality of components in an object efficiently, an IK controller can be used to animate the object by switching a solver for a first component of the object to be in an active state, and automatically switching the solvers of corresponding components to either be in an active or deactivate state in response to the solver for the first component. For example, an arm is first rotated to reach the maximal contact area with a table, and then translated to touch the table with a hand of the arm by automatically switching the solvers of other arm components, such as the shoulder, elbow, and wrist. It should be appreciated that the techniques provided herein are applicable to other component-to-component and other object-to-object interactions, e.g., appendages or objects besides arms making contact with other objects.

According to one aspect, a computer implemented method is provided for positioning an animated object composed of a plurality of associated components using chained kinematic logic.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DEFINITIONS

Figure 1:
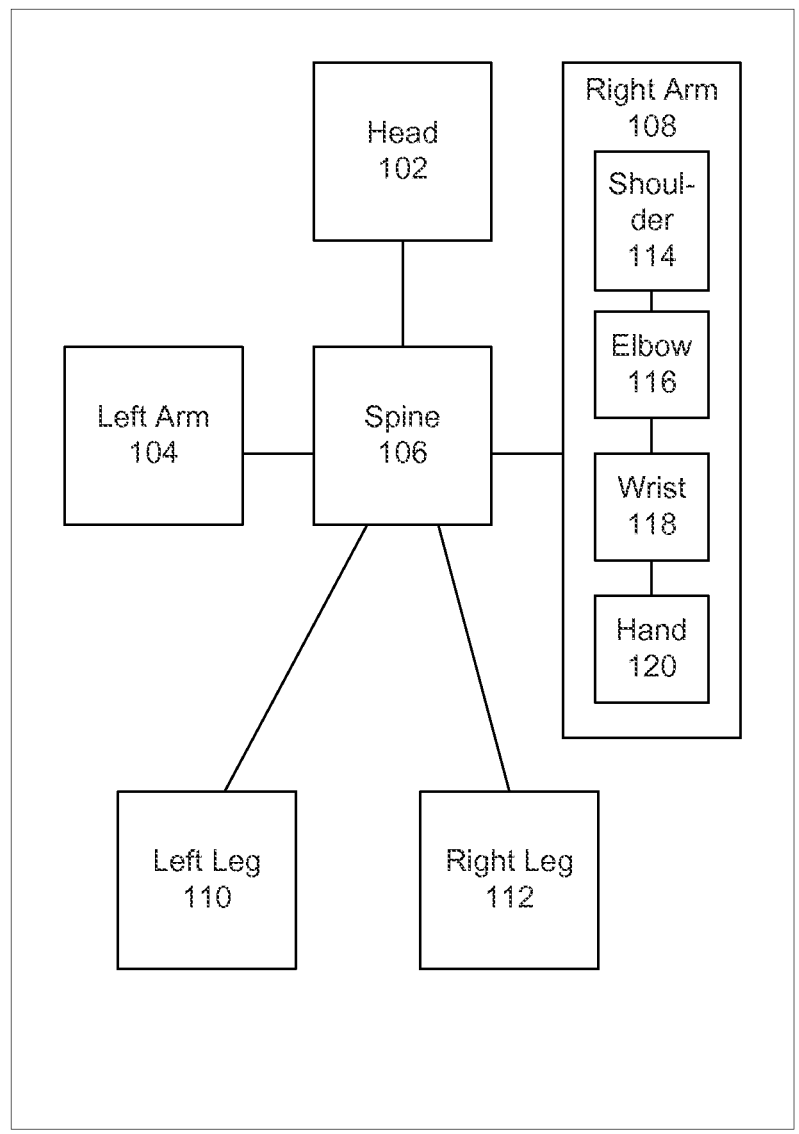
FIG. 1 illustrates a simplified block diagram of an animated character according to one embodiment.

An "IK controlled animated object", "animated object" or an "object" refers to an object which an animator wishes to animate, or provide kinematic characteristics to. An animated object may be comprised of a plurality of components. An "associated component" or "component" in the plurality of components of an IK controlled animated object (may also be referred to herein as an IK component) refers to a sub-part of the object. The components and the object can have a hierarchical relationship, for example, the object being a tree and the components being a root, trunk, branches, leaves, etc. Further, the plurality of components can have chained logic to link them, for example, the leaves are connected to the trunk of the tree via the branches.

A "control point" refers to a location on an object that defines a degree of freedom of movement or other state (e.g., luminescence). An "animation variable" (also referred to as AVAR) refers to a variable that can be changed by a user and whose change in value affects a change in one or more control points. A "deformer" refers to a function that implements the movement of a control point based on the value of an AVAR.

A "solver" refers to a function that uses deformers to determine the overall state (e.g., motion) of an entire object. An object can be composed of a plurality of components. A solver can be associated with a particular component of the object. For example, one solver for the motion of an arm is associated with a hand (hand solver) and another solver can be associated with an elbow for defining motion of the arm. Solvers can be mutually exclusive, required to be operated together, required to be operated in a certain order, and/or be related in other ways.

A "switch" for each solver determines and provides an indication of whether that solver is being used, i.e., being activated or deactivated. The switch can be associated with the state to a particular reference frame. For example, where the state is motion, the reference frame can be a global origin, or can be another object, where the corresponding controls (e.g., hand or elbow). For luminescence, the reference frame could be a global zero for luminescence or the luminescence of another object.

A "rig" can include the control points, AVARs, and solvers for the entire object. In some embodiments, only one solver may be used for a particular state. For example, one solver may be used for motion and one solver may be used for luminescence, magnetic or electrical properties, etc. The object (e.g., arm) could be part of a larger object (e.g., a body), and thus the term sub-rig may be used.

DETAILED DESCRIPTION

Embodiments of the present invention provide techniques for animating an animated object composed of a plurality of associated components using chained kinematic logic. Methods of animating an object may include determining a position of a component of an animated object relative to another component of the animated object. Animation methods can be executed and performed by various software and interfaces for manipulating positions of objects and their associated components, and can utilize kinematic algorithms, including, but not limited to inverse kinematics (IK) and/or forward kinematics (FK).

Multiple animated objects may be linked together based on chained hierarchical kinematic logic to form another animated object, for example, arms, legs, and a spine may be objects of a human body. Using IK, to rotate an object (e.g., an arm), a first component of the object linked to it as an endpoint (e.g., hand) may have a particular position. In turn, based on the chained kinematic logic, other associated components of the object (e.g., wrist, elbow) may have subsequent movements dependent on the position or movement of the first component. The association between the hand movement and the wrist and/or elbow movements may be based on chained logic representing the chained hierarchy. Using forward kinematics (FK), rotating the arm involves, for example, the first component being a shoulder as a start point, and the associated components (e.g., elbow, wrist, hand) follow based on the movement of the shoulder.

I. Inverse Kinematics

In kinematic animation modeling, components (e.g., fingers, hand, wrist, elbow, shoulder) are linked together in a hierarchical manner by means of parenting to form the movable joints in an object, such as an arm. A plurality of objects (e.g., arms, legs, spine, etc.) may further be linked together in a hierarchical chained manner to form a body. For example, the thigh may be the parent object of a shin, the shin may be a parent of the foot, and the foot may be the parent of toes, and so on. This linking establishes the chained hierarchy. When an object (like a thigh) is rotated, the child objects linked to it (shin, foot and toes) will follow along. This is the essential principle of hierarchical motion. And this method of working with a hierarchy is called forward kinematics. In forward kinematics (FK), motion is inherited down the hierarchy from the parents to the children.

In contrast to FK, in inverse kinematics (IK), motion is inherited up the hierarchy, from the extremities to the more proximal joints (closer to the body) which are their parents. This effectively allows an entire arm or leg to be posed by moving one object or point: an IK goal. As the IK goal is moved around, the extremities follow it, and the joints above it in the hierarchy readjust accordingly based on an IK solution algorithm. In order for the joints to readjust appropriately, control points are typically assigned to the joints, such that the joints do not bend beyond a realistic range of motion. The control points provide constraints or "degrees of freedom" for the joints.

In forward kinematics (FK), each of the values for each control point is dialed in by the animator, and a rig for the entire object is executed to cause the character to animate. The rig can include multiple control points, AVARs, and solvers for the entire object. The animator can alternatively specify values of the AVARs, which include multiple control points. Thus, for example, using FK, to move an arm to a desired pose, the animator may start with defining the control point at the shoulder of the arm and work down to the control points of the fingers until the entire arm is at the desired pose. To animate an arm picking up a pen can be difficult and tedious to the animator because every future position is defined by each control point by the animator, and there can be many different ways for an arm to pick up a pen.

In contrast, in IK, the animator can define the end position of the object, such as the arm with the hand in contact with the pen, and there is a solver (an IK solver) that can determine the best values for all the control points associated with all the components of the arm, to achieve the desired end position. The components of the arm have hierarchical and chained IK logic for each solver of each component, including a plurality of AVARs and a plurality of control points. For example, the arm may be composed of the shoulder, elbow, wrist, hand, and fingers, each having their own solver. An elbow solver may further include several AVARs controlling several control points that define various details of elbow movement, such as rotation, angle, and range of movement, etc. The elbow solver may know that the elbow cannot bend backwards past 180 degrees vertically, and that the elbow has a different rotational range than the shoulder or a knee.

The chained relationship between components in an object may be analogous to a hierarchical tree with branches, each branch having several leaf nodes. In IK, the animator may designate the desired end position of a leaf node, and a solver may determine an associated branch on which the leaf node is hierarchically chained to, and how to move the branch to result in the leaf node being at the desired end position.

To do so, the animator may be provided with an interface of AVARs to adjust. The AVARs designate the movement of multiple control points included in one or more corresponding components of an object. AVARs may define each movement and/or every rotation that may affect the final desired position. In IK, in the case of putting a hand on a desk and having the hand be "locked" in contact with the desk, animators can use IK to specify the translation of the hand. The animator may specify that the hand is locked to the desk and the remaining movement and rotations of the other components of the arm are automatically solved by an arm solver depending on the translation of the hand designated by the animator. The arm solver can translate x, y, and z direction and movement of all the remaining components of the arm and include additional constraints, such as the elbow having a range of bending 0-180 degrees to prevent the elbow from bending backwards, which would be unrealistic.

II. Rigs

The animated object can be a three-dimensional (3-D) model in 3-D space in which the object can be positioned and/or move around in. There may be an internal structure to the object which may be provided to a user (e.g., animator) as an interface including one or more components of the object that deform the model of the object. In an embodiment, there is also an interface that the animators use to manipulate those deformations, which can be referred to as the rig. A single object may comprise certain physical properties, such as elasticity, shape, translucence, luminescence, etc.

A rig can include the control points, AVARs, and solvers for the entire object. In some embodiments, only one solver may be used for a particular state. For example, one solver may be used for motion and one solver may be used for luminescence, magnetic or electrical properties, etc. The object (e.g., arm) could be part of a larger object (e.g., a body), and thus the term sub-rig may be used.

The basic geometry of an arm for instance may be represented as a sculpture. However, to animate the arm may involve building several pieces of the arm, such as fingers, hand, wrist, elbow, etc., and then adding a movement and/or position for each piece. Creating a rig for the object to animate the object may be analogous to, for example, building a physical marionette. To build a marionette, the shapes of the pieces may be carved first, and then strings may be attached to each piece to define the type of movement that is possible for each piece of the entire marionette. Animating the object involves instrumenting the geometric model (e.g., components of the object) with virtual strings (e.g., control points), which are degrees of freedom that the animator can use, for example, each control point may define a degree and direction in which the left elbow can be bent, or a degree at which the wrist can be twisted.

Each of these control points for each component, when packaged together, becomes a rig. Therefore, the animator may see a control for each control point corresponding to each component, a plurality of components making the object, and can change the values of each control point to animate the object. The rig may be a set of controls for different control points having different types of motion. For example, the control point for an elbow is different than the control point for a wrist because the elbow has a different range of motion and positioning than a wrist does. In some embodiments, the control points may be associated with broad movement, such as the angle of motion for an elbow joint.

In other embodiments, control points may be associated with fine-tuned movements, such as the bulging for a bicep. In another example, control points may control the degree to which the middle part of the left eyebrow is raised. The combination of many control points can define and control an animation variable or AVAR. An AVAR can typically control some number of control points. In the case of an elbow bend, the elbow AVAR is controlling hundreds and hundreds of points at once. However, to the animator (e.g., user), the user is effectively controlling one AVAR.

As such, the control points may be the smallest geometric unit, where a set of control points may form an animation variable (AVAR), and subsequently a set of AVARs may form a rig. The set of AVARs are provided to the animator as an interface to control the movements and positions of the animated object and all of its components. Deformers may execute computational mechanics associated with the AVARs and the values they are set to by the animators to move the control points in specific ways.

For example, to animate a translation of an object to move along a trajectory of points in a direction, multiple computational mechanics are involved, such as rotating behavior of the object. Additional computational mechanics include bending behavior, where depending on where a point along the trajectory the object is, the object may move less or more at an angle or bend. There may also be smoothing behavior, such that the movement of the object between points is not disjointed but continuous and smooth. Many of the computational mechanics may be represented by mathematical algorithms applied to the points based on the animator's control of that interface of AVARs.

The computational mechanics define how the control points move and are executed by deformers. Each deformer can include one or more AVARs as input and additional a set of points in space for the movement and position of the object. Thus the deformer controls multiple AVARs, which in turn control multiple control points. In an embodiment, deformers may receive additional constraints other than AVARs for specific movements, such as a pivoting movement. For a pivoting movement, the deformer may define a rotation angle (e.g., 10 degrees) and a pivot location point to rotate around. Thus deformers may be customized by the animator to include additional constraints outside of the set of AVARs that may be associated with a specific deformer by default.

FIG. 1 illustrates a simplified block diagram of an animated human body character 100. The animated character 100 may be comprised of several objects, including a head 102, a spine 106, a left arm 104, a right arm 108, a left leg 110, and a right leg 112. The head 102, right arm 108, left arm 104, left leg 110, and right leg 112 are all connected to the spine 106. Thus, for example, movements in the spine 106 may potentially effect movements in the left leg 110 and/or right leg 112. Each object may also be broken down and be comprised of several components, each component having a corresponding solver. As shown in FIG. 1, the right arm 108 may include a shoulder 114, an elbow 116, a wrist 118, and a hand 120.

Components forming an object or objects forming a body can have a chained hierarchy to link the components and/or objects together. For example, in the example of right arm 108, components closer to the spine 106 may be a parent component, making the elbow 116 a child component of the shoulder 114, then the wrist 118, and then the hand 120, being at an extremity of the right arm 108. The chained hierarchy logic may be extended in both directions, both up the root and down to the nodes. For example, the hand 120 may be further broken down into sub-components, such as a palm, thumb, and individual fingers (not shown). In another example, the human body character 100 may be part of a mob of 10,000 people walking through the street.

Each component has a corresponding solver. For example, the shoulder 114 has a shoulder solver, the elbow 116 has an elbow solver, the wrist 118 has a wrist solver, and the hand 120 has a hand solver. The solvers use deformers to determine the overall state (e.g., motion) of their corresponding component. Deformers include functions that implement the movement of the solver based on animation variables (AVARs), which affects a change in one or more control points of the component.

Accordingly, as will be described herein, embodiments can also allow animators or other users to position an IK object and effectively "lock" the IK component associated with that IK object to a surface object, e.g., such that the IK component maintains a specified distance from the surface object within a specified tolerance amount. For example, an animator may desire to interact the foot of an animated character object to a ground or surface object. Thus, as an example, and according to certain embodiments, the animator may identify a desired target pose of an IK goal such as an ankle point or other point of a foot component and the system will automatically adjust the position and alignment of the IK component to interact to another object.

III. Switches

As several components in an object may have motion and position hierarchy as described above, embodiments relate to generating chained IK logic, such as automatic switches of each solver for each component of the object. In some cases, the IK logic of a first component may not be compatible with the IK logic of a second component. Then, the solver for the first component may be deactivated before activating the solver for the second component, or vice versa.

Every component in the plurality of components that form an object can have an individual IK solver. For example, an arm may be composed of a shoulder IK solver, an elbow IK solver, and a hand IK solver. In some embodiments, individual components solvers may be mutually exclusive such that multiple associated solvers cannot be on at the same time. Thus, in the example of animating an arm, the elbow IK solver and the hand IK solver cannot be on at the same time, as their AVARs may conflict with one another. Thus, using chained IK logic, when the hand solver is activated, the elbow solver may be automatically deactivated, and vice versa. Without using chained IK logic as described in present embodiments, the animator would be required to manually deactivate the elbow solver when the hand solver is activated; however the extra step of deactivating the elbow solver takes time and may be prone to being forgotten by the animator, resulting in either an animation of the arm that will not execute, or an animation that does not appear to be realistic.

Figure 2:
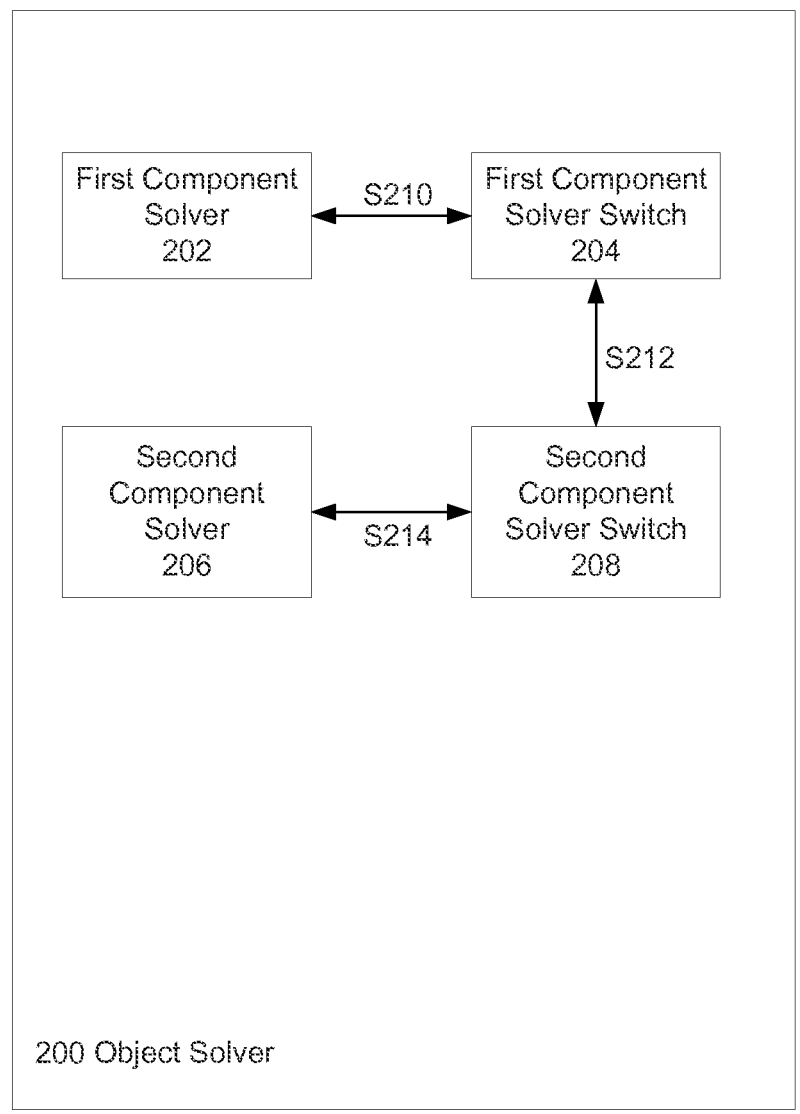
FIG. 2 illustrates an example of associated switches of solvers for components in an object according to various embodiments.

FIG. 2 illustrates a block diagram of an object according to one embodiment. An object may be animated using an object solver 200. The object solver 200 may include a first component and a second component. The first component may be controlled by a first component solver 202 and the second component may be controlled by a second component solver 206. A status of the first component solver 202 may be defined by a first component solver switch 204, being either activated or deactivated, as shown in S210. Similarly, a status of the second component solver 206 may be defined by a second component solver switch 208 being activated or deactivated, as shown in S212.

The second component solver 206 and the first component solver 202 may be associated as defined by a hierarchical chained logical relationship between the second component solver switch 208 and the first component solver switch 204. In one example, the first component solver 202 and the second component solver 206 both cannot be on at the same time, as their AVARs may conflict with one another. In this example, the first component solver switch 204 and second component solver switch 208 are linked by S212 in defining their hierarchical chained relationship as being mutually exclusive. Using chained IK logic, when the first component solver switch 204 is activated, the second component solver switch 208 may be automatically deactivated, and vice versa. Accordingly, when the first component solver switch 204 is activated, the first component solver 202 is turned on, as shown in S210. The second component solver switch 208 is then automatically deactivated in response to the first component solver switch 204 activation, as shown in S212. Subsequently, the second component solver switch 208 deactivation turns off the second component solver 206, as shown in S214.

In another embodiment, one solver may be dependent on another solver. For example, animating a spine may involve a bottom solver for the lower spine, a middle solver for the midsection of the spine, and a top solver for the upper portion of the spine. The middle solver cannot be activated without the top solver being activated since without the top solver, the position of the upper portion of the spine is undefined and unknown, providing no input for the middle solver to determine a position for the midsection of the spine, and so forth with the bottom of the spine with respect to the position of the lower spine. Thus, the animator may first activate the top solver to define a final desired position, and then, by using chained IK logic, the middle solver is also automatically turned on.

Manually setting multiple switches to activate or deactivate corresponding solvers to adjust the individual position and movement of each component for each object can be time consuming for the animator and prone to human error. Manual determination of associated components and manual adjustment of their corresponding switches and solvers are prone to error and can result in an unrealistic animation of the entire object, and ultimately the character. For example, the animator may forget to adjust the setting of the switch for the wrist solver after setting the switch of the hand solver in the arm, thus producing an awkward angle or movement of the entire arm as the character moves from a sitting position at the table to a standing position with the hand remaining on the table.

Referring back to FIG. 2, in another example, the first component solver switch 204 and second component solver switch 208 are linked by S212 in defining their hierarchical chained relationship as being mutually inclusive. Using chained IK logic, when the first component solver switch 204 is activated, the second component solver switch 208 may be automatically activated, and vice versa. Accordingly, when the first component solver switch 204 is activated, the first component solver 202 is turned on, as shown in S210. The second component solver switch 208 is then automatically activated in response to the first component solver switch 204 activation, as shown in S212. Subsequently, the second component solver switch 208 activation turns on the second component solver 206, as shown in S214.

IV. Animating an Object Using Chained IK Logic

In some embodiments, the animator may specify the final desired position as an x, y, and z position or coordinate. Each solver corresponding to a particular component may determine values for other AVARs, including additional x, y, z positions along a trajectory from the final desired position. Other AVARs may be the speed of the movement from point to point along the trajectory, rotation, and corresponding movements of associated components. For example, animating a hand turning a doorknob involves the fingers wrapping around the door knob to grasp it, a twisting motion that occurs in the forearm, through the wrist, and also affecting the positions of the fingers wrapper around the doorknob, and a translation to pull on the doorknob out, affecting motion from the shoulder to the elbow and hand as the door is pulled out.

As such, according to various embodiments, chained IK logic determines hierarchical dependencies between associated components of an object. Hierarchical dependencies between associated components may be based on various variables, characteristics, conditions, and/or rules. For example, physiological conditions, such as a hand being connected to a wrist and not to a knee, can be used to determine a hierarchical dependency between a hand and a wrist but not between the hand and a knee, thus the movement of the hand would not normally automatically affect the movement of the knee, but could affect the movement of the wrist. Other conditions may be based on properties of physics, such as gravity affecting the movement of objects and their components, for example an apple on a table does not remain floating if one of the table legs buckles and the table collapses. Other factors used in determining the hierarchical dependencies and relationships between components and objects and other examples are discussed in further detail below. Thus, based on chained IK logic, a series of switches corresponding to a series of solvers may be created such that when a first solver for a first component in an object is activated, it can be determined whether corresponding solvers for one or more additional components associated with the first component should be activated or deactivated in response to the first solver being activated.

Accordingly, determining chained IK logic between associated components forming an object can create a mechanism for animators to change the model of an entire object into different states very easily. Since dependencies between the switches of various solvers and their corresponding components are detected and activated/deactivated automatically, animators may activate a first switch for a first solver, which can cause a series of associated switches and solvers to be activated or deactivated based on the chained IK logic between the associated components. As such, animators can animate an object having various components without manually determining what the associated components are, how their respective solvers are hierarchically chained to each other, and manually activate or deactivate each respective solver.

Figure 3:
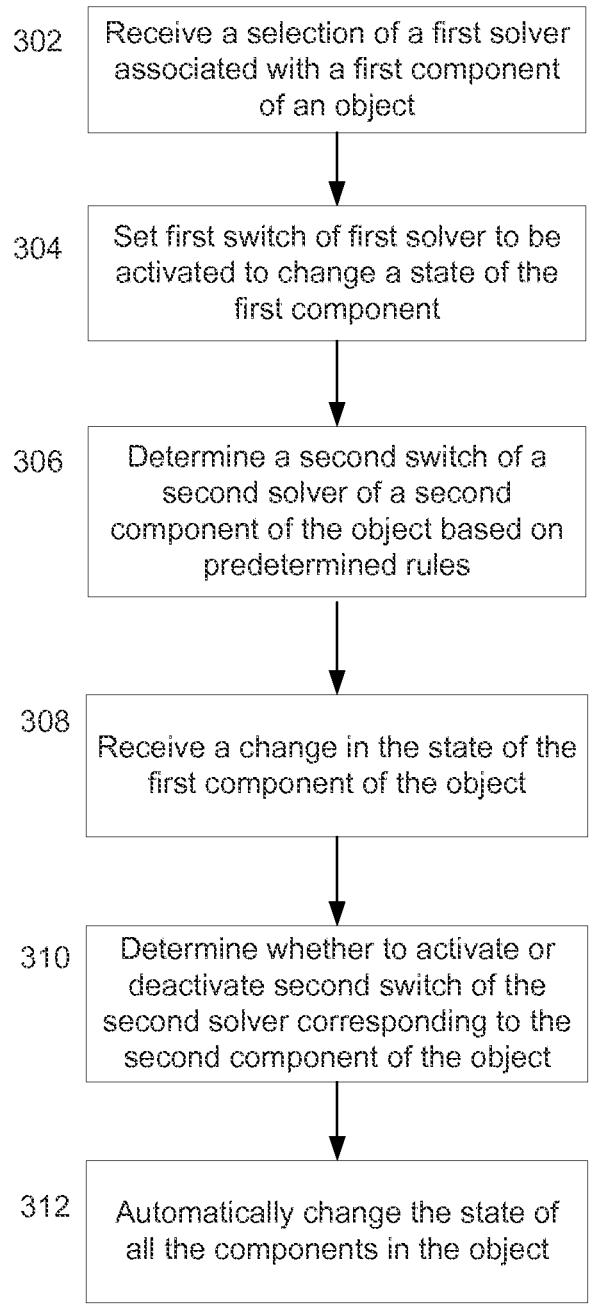
FIG. 3 illustrates a simplified flowchart showing a method of animating an object according to one embodiment.

FIG. 3 illustrates an example method 300 of animated an object composed of a plurality of components according to one embodiment. All of parts of method 300 may be implemented by a computer system. Some steps of method 300 can be optional.

The method 300 can include receiving a selection from a user (e.g., animator) a selection of a first solver associated with a first component of the object, as shown at 302. The animator may provide the selection via an interface including various AVARs and associated control points with the AVARs. The selection of the first solver can include several AVARs for the first component, with each AVAR including one or more control points. For example, the user may select a hand solver as a first solver, the hand solver affecting the kinematics of a hand being an endpoint using chained IK logic to animate an arm of a character.

At 304, after the selection of the first solver, a first switch of the first solver is set to be activated to change a state of the first component. The first solver may set the values of various AVARs for the first component, thus affecting the state of the first component. For example, after the hand solver is selected, a hand solver switch is activated. The state of the hand is determined by a status of the hand solver, in which the hand solver switch is either activated or deactivated to set values of various AVARs, including several control points. Control points can include degrees of freedom for each joint of individual fingers, a concavity of a palm, an angle of the palm, etc. A single AVAR may represent a finger, for example, setting several control points of that finger to cumulatively, with other AVARs of the hand solver (e.g., other fingers, palm, thumb) to set the state of the hand.

At 306, a second switch of a second solver of a second component of the object is determined based on chained kinematic logic. Using chained hierarchical IK logic, it can be determined whether one or more components are associated with the first component. For example, a second solver following the hand solver may be determined to be a wrist solver corresponding to a wrist as a second component in the arm. The hand solver and wrist solver may have a hierarchical chained relationship such that the hand solver and the wrist solver are mutually exclusive and that a status of the wrist solver can be dependent on a status of the hand solver. As such, a state of the wrist is dependent on the state of the hand.

At 308, receiving a change in the state of the first solver associated with the first component of the object from the user. The user may set a final desired position for the object, which can differ from an initial position of the object. For example, the user may change the state of the hand from an initial position of resting flat on a table while the character is sitting at the table to a final position of the hand pushing on the table as the character stands up.

Based on chained kinematic logic and other criteria, at 310, the method can further include determining whether to activate or deactivate the second switch of the second solver associated with the second component of the object. Determining whether to activate or deactivate subsequent switches in response to a first switch may be executed by a binary decision tree or lookup table. Any suitable methods of implementing hierarchical dependencies between multiple switches and storing them may be used. When the one or more components are associated with the first component of the object, the statuses of the corresponding solvers for the one or more associated components may be determined by activating or deactivating the corresponding solvers' switches in response to the state of the first component and the status of the first solver (e.g., whether the first solver's switch is activated or deactivated).

In one embodiment, a lookup table may be used to determine whether to activate or deactivate a switch of a corresponding solver. For example, a first component may have a couple relationships, one relationship for the situation when the switch is turned on and another relationship for when it is turned off. These relationships may be linked to any number of other switches. When the first component is switched on, the lookup table may be accessed for all the switches in the "on" relationship and switches them based on a parameter that has been set for each individual switch. Alternatively, when the first component is switched off, the lookup table may be accessed for all the switches in the "off" relationship.

Accordingly, following the example of animating the arm, the user may change the state of the hand by activating the hand solver switch to turn on the hand solver. It may then be determined, based on a mutually exclusive hierarchical relationship between the hand solver and the wrist solver, to deactivate the wrist solver switch to change the status of the wrist solver. The determination to deactivate the wrist solver switch when the hand solver switch is activated may be based on a pre-existing chained hierarchical relationship between the hand solver and the wrist solver as being mutually exclusive. Other chained hierarchical relationships between other components can be such that they are mutually inclusive.

At 312, the method includes using the first solver to automatically change the state of all the components in the object, since based on the chained IK logic, one or more associated components of the first solver for the first component in the object have been determined. Thus, based on the selection of the first solver by the user and the user changing the state of the first solver of the first component, the states of the corresponding solvers for the associated components may be automatically determined. For example, when the status of the wrist solver is set to have the wrist solver switch deactivated in response to the hand solver switch being activated, then the user can modify the status of the hand solver to animate the arm and corresponding components, including the wrist. When the wrist solver switch is deactivated, the wrist solver is turned off; thus, none of the wrist solver's associated AVARs and their control points are being set by the wrist solver. The status of the hand solver, using chained IK logic, can effectuate changes in the state of associated components, such as the wrist and elbow. As such, as noted above, when the user changes the state of the hand from an initial position of resting flat on a table while the character is sitting at the table to a final position of the hand pushing on the table as the character stands up, the states of the wrist and elbow are updated accordingly.

Not only may associated components be automatically determined, but also related separate objects that the primary animated object is in contact with, or an environment in which the animated object is positioned in. In a simplified example, animating a spider with eight legs crawling on the floor involves relationships between each leg to the spider's body and each leg to the floor, such that even when the terrain of the floor changes, each leg remains in contact with the floor and to the body of the spider. Further, the movement of each of the legs may be indirectly related to the movement and position of the body and the other legs as well. So when the spider starts crawling down a series of downward steps, the movement of one leg is extended to a lower step can cause the other legs that are still on a higher step to bend and the body of the spider may tilt downwards towards the leg extended on the lower step.

Figure 4:
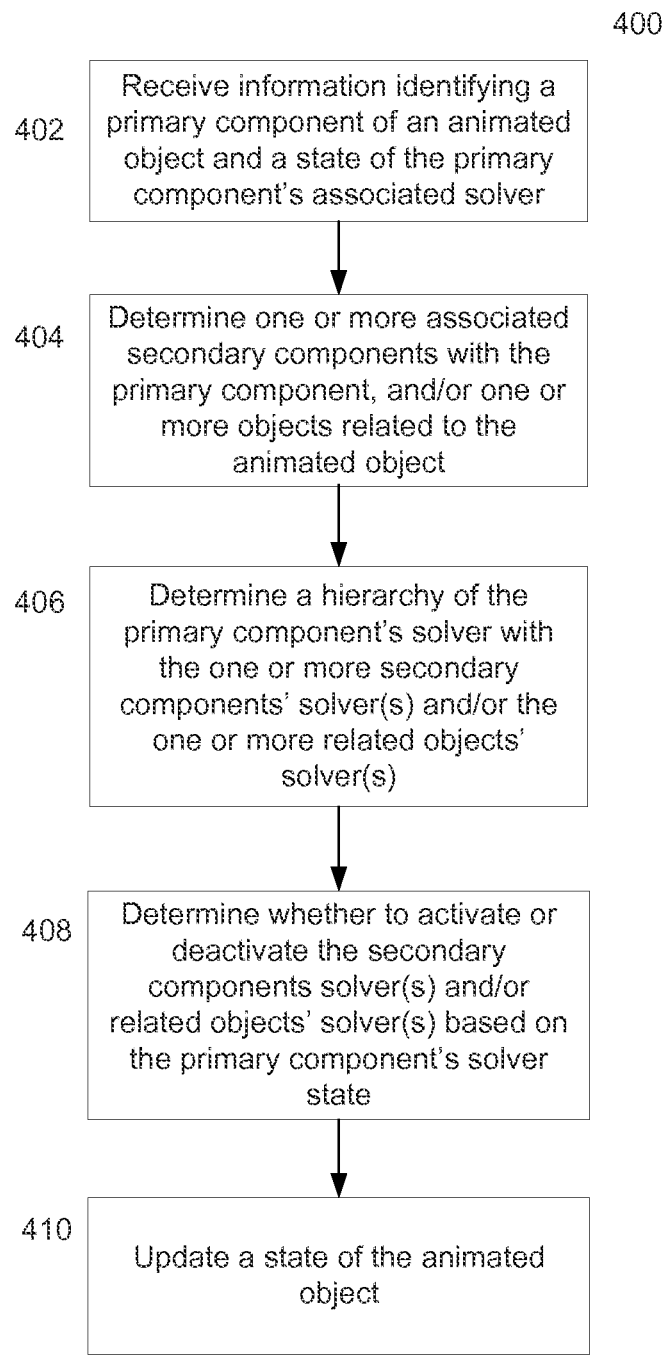
FIG. 4 illustrates a simplified flowchart showing a method of chained IK logic according to one embodiment.

FIG. 4 illustrates a flowchart of an example method 400 of determining hierarchical chained kinematic logic of an object according to one embodiment. Chained kinematic logic may provide constraints for associated components within an object, between different objects, or between an object and its environment. The chained kinematic logic may include criteria defining a series of switches chained in a hierarchical manner such that when one root switch is activated, then some or all subsequent leaf switches are deactivated. Alternatively, the chained kinematic logic may instruct some or all subsequent leaf switches to be activated when a root switch is activated. Activating and deactivating subsequent leaf switches may also be applied after deactivating a root switch.

At 402, the method includes receiving information identifying a primary component of an animated object and a state of the primary component and a status of the primary component's associated solver. The desired animated object can include a plurality of components, with a primary component being a leaf component in the root-to-leaf analogy, such that the information identifying the primary component includes a final desired position designated by a user. The state of the primary component can be determined by the status of the primary component's associated solver. The status of the primary component's solver can be whether the switch for the primary component's solver is activated or deactivated. For example, the user may designate the final desired position for an arm as a hand of the arm resting on a table.

At 404, the method further includes determining associated secondary components with the primary component in the plurality of components that form the object. For example, an elbow and shoulder have an associated relationship with the hand, all of which form an arm. The associated relationship between the elbow and shoulder may be defined by chained IK logic, or other chained hierarchical kinematic logic. In other embodiments, it may be determined whether there are other separate objects related to the animated object. For example, the hand may be also related to a table.

Next, the method can further comprise determining a hierarchy of the primary component's solver with the one or more secondary components' solver(s) and/or the one or more related objects' solver(s). Based on a hierarchical chained relationship between the primary components and other secondary components, the statuses of the secondary components' solvers may be dependent on the primary component's solver. Accordingly, switching relationships may be determined, that can include, but are not limited to switching dependencies, switching order, and/or mutual exclusivity.

Additionally, once the hierarchy between the primary component's solver and the secondary components' and/or other related objects' solver(s) are determined, the method comprises, at 408, determining whether to activate or deactivate the second components' solvers' switch(es) and/or related objects' solvers' switch(es) based on the primary component's solver status. For example, if the status of the primary solver is that the primary solver's switch is activated, a status of a secondary solver may be set such that the secondary solver's switch is automatically deactivated.

The hierarchy may extend beyond the relationship between a primary component to a secondary component and the deactivation/activation of the primary component may be propagated down several degrees be inclusive of several components. For example, the change in status of a hand being at the side of a character's body to waving goodbye in the air involves multiple components, including the hand, wrist, forearm, elbow, upper arm, and shoulder. The activation of the hand solver can in turn activate or deactivate other solvers beyond the wrist solver, as the hand waving does not simply occur with the arm remaining at the side of the character's body. The elbow is bent to bring the forearm, wrist, and hand up, and the shoulder may adjust the angle of the upper arm so that the upper arm does not remain the side of the body, but at a more natural angle for the character to be waving goodbye. Although in some examples in the specification describe a primary and secondary component and their hierarchical relationship of the status of the primary component affecting the secondary component, embodiments of the present application are not limited to hierarchical relationships of one degree between two components or objects. Embodiments of the present application are inclusive of propagated statuses forming chained hierarchical relationships of multiple degrees including multiple associated components and objects.

In some embodiments, propagation may happen before any solvers are selected or activated/deactivated, or after the first solver is activated/deactivated and then other solvers may follow in suit based on their relationship(s) to the first solver. Each solver may have a list of dependencies, such as a list of dependent solvers and whether they should be activated or deactivated, and in what order in response to the activation of the first solver. Before any of the solvers begin switching, a list of dependencies for the switch of the first solver can be changed. Then, a second solver and its list of dependencies may cause other solvers to be activated or deactivated.

Accordingly, each solver in the first list of dependencies of the first solver can then cause other solvers to be switched to activate or deactivate, and continue for each solver and each solver's associated list of dependencies. The activated solvers can be coordinated to occur in a specific order. Each solver's list of dependencies may be cross-checked in a pre-defined table to avoid conflicts and inconsistencies. Further, each list of dependencies may be limited to a certain number of levels of hierarchies, depending on the hierarchical relationship of the first solver with the remaining solvers. For example, a hierarchical chain from fingers of a hand to the elbow of the arm to animate a character clapping compared to a hierarchical chain from the fingers of the hand all the way to a torso of the character to animate throwing a ball.

Propagation may occur until either the end of all chains is recursively reached such that no more switches are activated, or until a predetermined cycle is complete. While propagating, a list may be maintained to record and keep track of switches that have been visited already. When and if the propagation through the chain reaches an already visited switch, the chain can be checked to determine whether the chain will cause the switch to be set to something other than what it was set to the first time it was visited. The status of the switch from the first time it was visited (i.e., when it was set in a list of dependencies from a second solver activated in response to a first solver) can be compared to another status of the switch in the current list of dependencies (e.g., a status in which the current list of dependencies from an alternative solver wants to set the switch to). If the switch matches, this can be considered to be valid cycle and propagation can end for that branch. The chain may continue propagating along any other list of dependencies that have not completed a valid cycle. As such, a complete valid cycle occurs when all the switches are set correctly. Alternatively, if a chain reaches an already visited switch but the switch does not match (i.e., it wants to set the switch to a different value than the first visit set), this is considered to be an invalid cycle. Accordingly, the switching of the chain can be abandoned, such that the switch is only set the initially authored constraint and all other switches in the chain can be ignored, for example, ignoring the predetermined rules for specifying statuses of switches in response to the activation of the first switch.

Lastly, at 410, a state of the entire animated object, including the primary component and all associated secondary components and/or related objects may be updated. For example, updating the hand solver such that the hand solver's switch is activated to move the hand may also subsequently result in changes to the statuses of other solvers for other components and/or objects, such as the elbow, shoulder, and table based on the hierarchical chained IK logic between the elbow, shoulder, and table.

Chained kinematic logic may further comprise other criteria such as a specific order of switches corresponding to a hierarchy of their respective components or objects. Other criteria may define when an animator chooses to activate the switch on the hand solver, and a switch for the elbow solver may be deactivated. However, interacting with another object such as a table may change criteria in the chained kinematic logic. For example, in animating a hand interacting with a table, there may be some dynamic criteria defining dynamic dependencies, such as the hand's position on the table surface depending on where it is on the table (e.g., edge, corner, middle of table top), physical characteristics of the table (e.g., confirming the hand to an uneven table surface), etc. In some embodiments, additional criteria may define static dependencies of solvers that may be predetermined by default and remain constant as they are independent of other criteria (e.g., an elbow can never bend backwards naturally). In other embodiments, criteria may define dynamic dependencies of the solvers, in which the chained kinematic logic between solvers may change dependent on other criteria. For example, chained kinematic logic defining hierarchical movements of the components of the arm may be different when the character is in the water compared to in the air.

Based on chained kinematic logic, the associated solvers that are activated can move the internal mechanics to give information to a deformer, which in turn executes the movement of each and every component that forms the object. The chained IK logic linking a plurality of components to an object (e.g., shoulder, elbow, and hand forming a right arm) may be applied to a plurality of objects that together form an animated character (e.g., right arm, left arm, chest, etc. forming a human body). Animating the object involves instrumenting the geometric model (e.g., components of the object) with control points, which are degrees of freedom that the animator can use, for example, each control point may define a degree and direction in which the left elbow can be bent, or a degree at which the wrist can be twisted.

Each of these control points for each component may together, form a rig. The rig may be a set of controls for different control points having different types of motion. For example, the control point for an elbow is different than the control point for a wrist because the elbow has a different range of motion and positioning than a wrist does. In some embodiments, the control points may be associated with broad movement, such as the angle of motion for an elbow joint.

In other embodiments, control points may be associated with fine-tuned movements, such as the bulging for a bicep. In another example, control points may control the degree to which the middle part of the left eyebrow is raised. The combination of many control points can define and control an animation variable or AVAR. An AVAR can typically control some number of control points. In the case of an elbow bend, the elbow AVAR is controlling hundreds and hundreds of points at once. However, to the animator (e.g., user), the user is effectively controlling one AVAR.

As such, the control points may be the smallest geometric unit, where a set of control points may form an animation variable (AVAR), and subsequently a set of AVARs may form a rig. The set of AVARs are provided to the animator as an interface to control the movements and positions of the animated object and all of its components. Deformers may execute computational mechanics associated with the AVARs and the values they are set to by the animators to move the control points in specific ways.

For example, to animate a translation of an object to move along a trajectory of points in a direction, multiple computational mechanics are involved, such as rotating behavior of the object. Additional computational mechanics include bending behavior, where depending on where a point along the trajectory the object is, the object may move less or more at an angle or bend. There may also be smoothing behavior, such that the movement of the object between points is not disjointed but continuous and smooth. Many of the computational mechanics may be represented by mathematical algorithms applied to the points based on the animator's control of that interface of AVARs.

The computational mechanics define how the control points move and are executed by deformers. Each deformer can include one or more AVARs as input and additional a set of points in space for the movement and position of the object. Thus the deformer controls multiple AVARs, which in turn control multiple control points. In an embodiment, deformers may receive additional constraints other than AVARs for specific movements, such as a pivoting movement. For a pivoting movement, the deformer may define a rotation angle (e.g., 10 degrees) and a pivot location point to rotate around. Thus deformers may be customized by the animator to include additional constraints outside of the set of AVARs that may be associated with a specific deformer by default.

Criteria defining hierarchical chained kinematic logic may not be limited to defining movement and relationships between associated components forming an object, or associate objects forming a character, but may also define a relationship between separate individual objects or a character and one or more objects. For example, a character's arm in contact with a table, with both the character and the table in contact with the ground. The relationship may be physical contact, or other forms of interaction, such as by magnetic forces, electrical forces, environmental factors (e.g., wind, water), etc. to create motion dependency between objects.

In determining the chained IK logic of a first object and/or one or more of its associated components, it may be determined whether the first object will be attached to another object, attached to itself (e.g., another component of the first object), or detached from another object, itself, or all objects. Thus, the chained hierarchical IK logic of an object can be dependent on connections and disconnections from the object to/from other components of itself, other objects, and/or its environment. The chained IK logic can provide instructions for deformers of the solvers to perform the actions of connection or disconnection before or after the first object. For example, when a hand of an arm is connected to a table, the elbow of the arm may first be disconnected, since the hand solver and the elbow solver have a chained IK logical relationship of being mutually exclusive. Connecting the hand and then the elbow at the same time could result in the entire arm being in a bad state or resulting in an unrealistic, unpredictable, and/or unintended animated motion.

Chained IK logic can include mutually exclusive relationships as in the hand solver and the elbow solver, but can also include specific orders of activating and/or deactivating associated solvers. Specific orders may be analogous to a chain reaction triggered by a first solver of a first component being switched to be activated to cause a series of associated solvers activating or deactivating in a specific order based on their switching dependency and other constraints for the chained kinematic logic. When a switch for a solver is activated out of order, a conflict in other solvers may occur, and results in an unrealistic, unpredictable, and/or unintended animated motion, or other bad state.

V. Example

Animating an Arm

Every component in the plurality of components that form an object can have an individual IK solver. For example, an arm may be composed of a shoulder IK solver, an elbow IK solver, and a hand IK solver. In some embodiments, individual components solvers may be mutually exclusive such that multiple associated solvers cannot be on at the same time.

Figure 5:
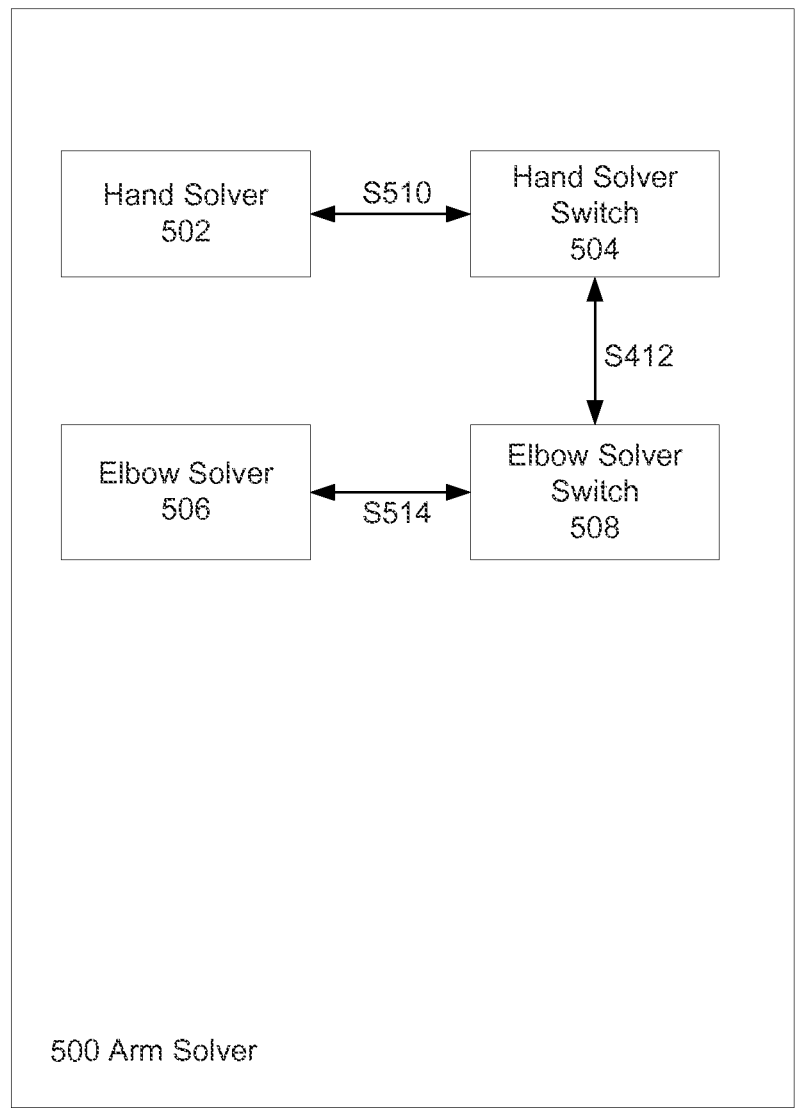
FIG. 5 illustrates an example of dependent switching of solvers in a hand solver according to various embodiments.

FIG. 5 illustrates a block diagram of an arm solver according to one embodiment. In the example of animating an arm, the arm solver 500 may comprise a hand solver 502 and an elbow solver 504. A status of the hand solver 502 may be defined by a hand solver switch 504, being either activated or deactivated, as shown in S510. Similarly, a status of the elbow solver 506 may be defined by an elbow solver switch 508 being activated or deactivated, as shown in S515.

The elbow IK solver 505 and the hand IK solver 502 cannot be on at the same time, as their AVARs may conflict with one another. The hand solver switch 504 and elbow solver switch 508 are linked by S512 in defining their hierarchical chained relationship as being mutually exclusive. Using chained IK logic, when the hand solver switch 504 is activated, the elbow solver switch 508 may be automatically deactivated, and vice versa. Accordingly, when the hand solver switch 504 is activated, the hand solver 502 is turned on, as shown in S510. The elbow solver switch 508 is then automatically deactivated in response to the hand solver switch 504 activation, as shown in S512. Subsequently, the elbow solver switch 508 deactivation turns off the elbow solver 506, as shown in S514.

Without using chained IK logic as described in present embodiments, the animator would manually deactivate the elbow solver switch 508 when the hand solver switch 504 is activated, to effectuate the status of the elbow solver 506 based on the status of the hand solver 502. However, the extra step of deactivating the elbow solver switch 508 to change the status of the elbow solver 506 takes time and may be prone to be forgotten by the animator, resulting in either an animation of the arm that will not execute, or does not appear to be realistic.

VI. Example

Animating a Spine

Figure 6:
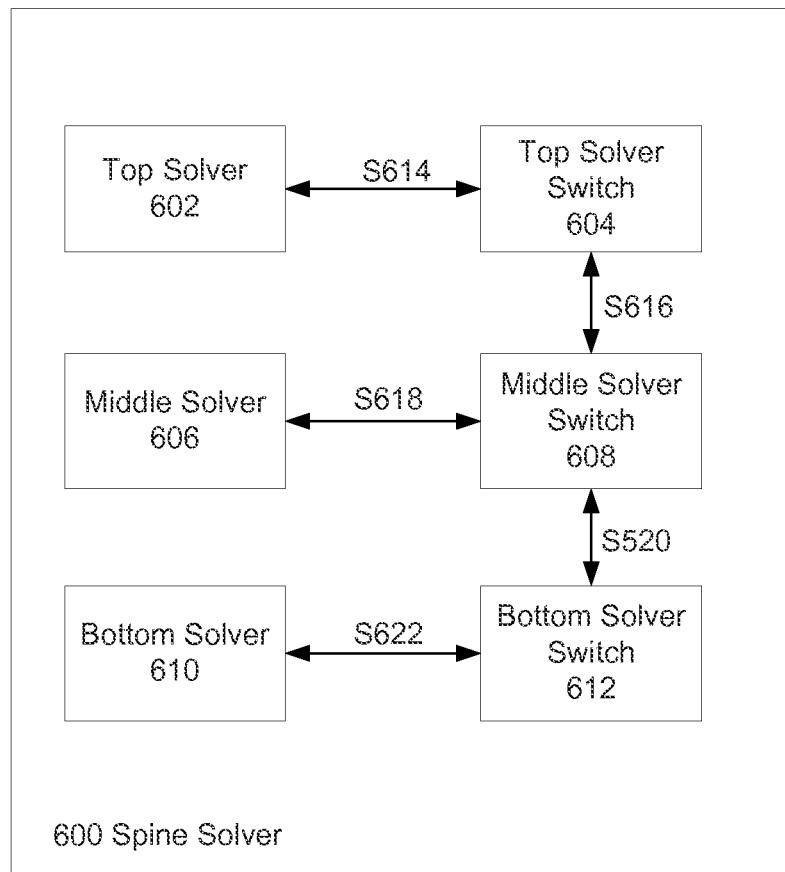
FIG. 6 illustrates an example of dependent switching of solvers in a spine solver according to various embodiments.

In another embodiment, the activation of one solver may be dependent on the activation of another solver. FIG. 6 illustrates a block diagram of an example spine solver according to one embodiment. For example, animating a spine using a spine solver 600 may involve a bottom solver 606 for the lower spine, a middle solver 606 for the midsection of the spine, and a top solver 602 for the upper portion of the spine. A status of the top solver 602 may be defined by a top solver switch 604 being activated or deactivated, as shown in S614. Similarly, a status of the middle solver 606 may be defined by a middle solver switch 608 being activated or deactivated, as shown in S618. Lastly, a status of the bottom solver 610 may be defined by a bottom solver switch 612 being activated or deactivated, as shown in S622.

The top solver switch 604 and the middle solver switch 608 are linked by S616, and the middle solver switch 608 and the bottom solver switch 612 are linked by S620. The relationship between the top solver switch 604 and the middle solver switch 608 shown in S616 may be defined such that the middle solver switch 608 cannot be activated without the top solver switch 604 being activated. Without the status of the top solver 603, the position of the upper portion of the spine is undefined and unknown, providing no input status for the middle solver 606 to determine a position for the midsection of the spine, and so forth with the bottom of the spine with respect to the position of the lower spine. The relationship between the middle solver switch 608 and the bottom solver switch 612 as shown by S620 may be defined such that when the middle solver switch 608 is activated, the bottom solver switch 612 is activated. Thus, the animator may first change the status of the top solver 602 to define a final desired position, and then, by using chained IK logic, the status of the middle solver 606 is such that the middle solver switch 608 is also automatically activated, and subsequently the status of the bottom solver 610 can be such that the bottom solver switch 612 is also activated.

As shown in the example of animating the spine in FIG. 6, the switching of the top solver switch 604 may be propagated (i.e., passed along) to dependent IK solvers, for example the middle solver switch 608, and then subsequently the bottom solver switch 612. The hierarchical propagation may extend further such that along each connection between solvers, logic can be placed that tells the subsequent solver how to switch and in what order to switch. Then the subsequent solver in turn, can pass that logic along to another solver.

As such, according to various embodiments, chained IK logic determines hierarchical dependencies between associated components of an object. Thus, based on chained IK logic, a series of switches corresponding to a series of solvers may be created such that when a first solver for a first component in an object is activated, it can be determined whether corresponding solvers for one or more additional components associated with the first component should be activated or deactivated in response to the first solver being activated.

VII. Additional Embodiments

In other embodiments, chained kinematic logic may define a relationship between two objects. The user may designate that a primary object is connected or disconnected to a secondary object, without specifying a position for either object initially. Already defining the relationship between two objects invokes a hierarchical series of kinematic functions such that when the user designated a final desired position of one of the objects, then the chained kinematic logic is defined further with additional constraints applied to solvers and the AVARs of the solvers.

In some embodiments, two objects or two components may have an independent relationship such that the secondary object's solver's AVAR values do not change with respect to the primary object's solver's AVAR values. In other embodiments, a primary object may be connected or disconnected to its environment, for example, a point in space or an origin.

In some embodiments, the chained kinematic logic may extend beyond the relationship between a primary component to a secondary component. The deactivation/activation of the primary component may be propagated down several degrees be inclusive of several components. For example, the change in the status of a hand being at the side of a character's body to waving goodbye in the air involves multiple components, including the hand, wrist, forearm, elbow, upper arm, and shoulder. The activation of the hand solver can in turn activate or deactivate other solvers beyond the wrist solver. The elbow may be bent to bring the forearm, wrist, and hand up, and the shoulder may adjust the angle of the upper arm at a more natural angle for the character to be waving goodbye. Embodiments of the present application are inclusive of propagated statuses of switches forming chained hierarchical relationships of multiple degrees including multiple associated components and objects.

The switching of a first solver may also be passed along to other dependent solvers and specific behaviors of the dependent solvers. For example, a first solver may switch to be activated. The first solver may have a hierarchical relationship with a second solver such that the second solver is dependent on the first solver. Thus, it is determined whether the second solver switch should be activated or deactivated, whether the second solver switch should be activated or deactivated before or after the first solver switch being activated, and whether the second solver is constrained by other solvers, etc. This determination may be based on attributes of the first and second solver and their relationship.

Chained kinematic logic may include mathematical computations and/or algorithms representing physical and mechanical movements, such as the control points for the AVARs. Chained IK logic can also be defined by Boolean logic using "and", "exclusive or", and "or". The predetermined rules may be automatically determined, and/or customized and saved as a configuration for future use.

Saved configurations and predetermined rules defining hierarchical chained IK logic for an object may be further extended, applied, and tailored to a new object to create a new rig for the new object. For example, a human arm rig can be defined with all the control points set for all the AVARs, all the AVAR values set for all the solvers, and all the solvers activated/deactivated according to their chained IK logical relationship. However, a robotic arm while different from a human arm, may behave similarly, but not identically, to a human arm. Thus, the human arm rig can be applied to a robotic arm rig but specific solvers and their AVARs may be modified and adjusted for the desired animation for the robotic arm.

VIII. System

Figure 7:
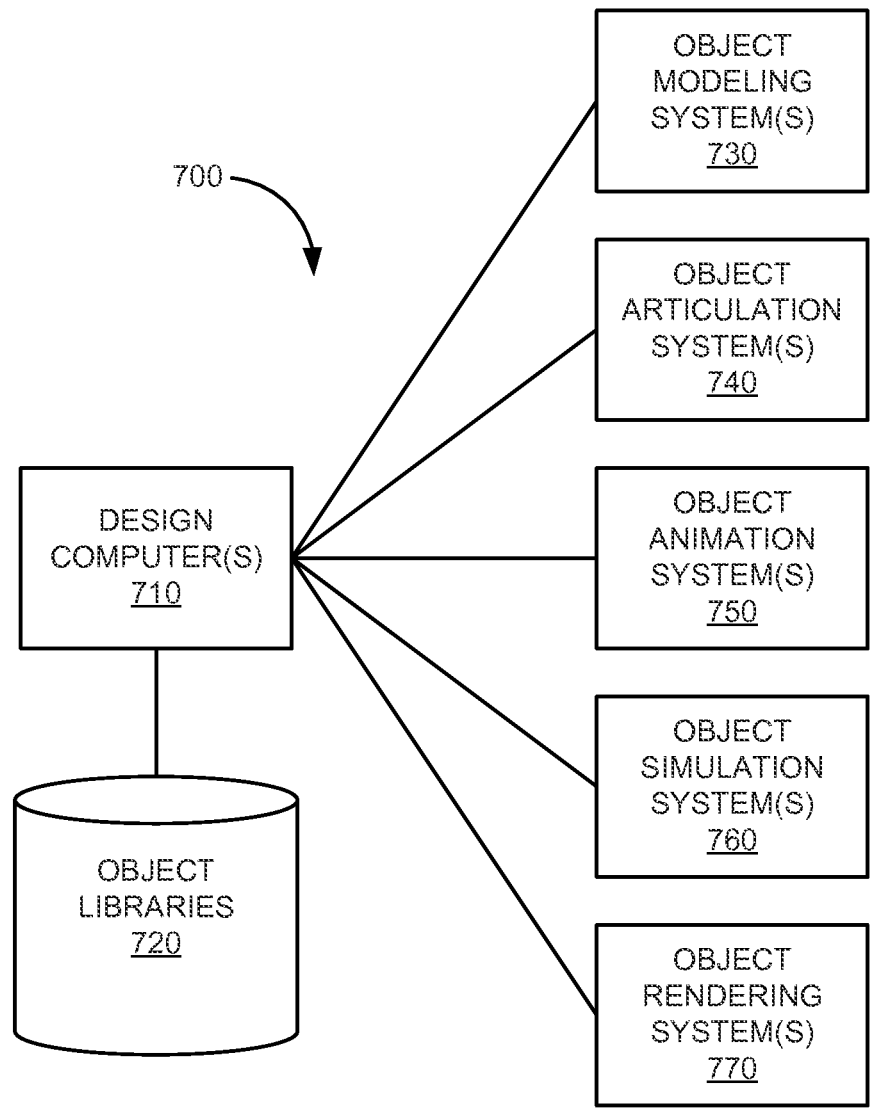
FIG. 7 is a simplified block diagram of a system for creating computer graphics imagery (CGI) and computer-aided animation that may implement or incorporate various embodiments of the present invention.

FIG. 7 is a simplified block diagram of system 700 for creating computer graphics imagery (CGI) and computer-aided animation that may implement or incorporate various embodiments. In this example, system 700 can include one or more design computers 710, object library 720, one or more object modeler systems 730, one or more object articulation systems 740, one or more object animation systems 750, one or more object simulation systems 760, and one or more object rendering systems 770. Any of the systems 730-770 may be invoked by or used directly by a user of the one or more design computers 710 and/or automatically invoked by or used by one or more processes associated with the one or more design computers 710. Any of the elements of system 700 can include hardware and/or software elements configured for specific functions.

The one or more design computers 710 can include hardware and software elements configured for designing CGI and assisting with computer-aided animation. Each of the one or more design computers 710 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 710 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 710 acting as an articulator may employ one or more systems or tools to design, create, or modify controls or animation variables (AVARs) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 710 acting as an animator may employ one or more systems or tools to specify motion and position of one or more objects over time to produce an animation.

Object library 720 can include elements configured for storing and accessing information related to objects used by the one or more design computers 710 during the various stages of a production process to produce CGI and animation. Some examples of object library 720 can include a file, a database, or other storage devices and mechanisms. Object library 720 may be locally accessible to the one or more design computers 710 or hosted by one or more external computer systems.

Some examples of information stored in object library 720 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 730 can include hardware and/or software elements configured for modeling one or more objects. Modeling can include the creating, sculpting, and editing of an object. In various embodiments, the one or more object modeling systems 730 may be configured to generated a model to include a description of the shape of an object. The one or more object modeling systems 730 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 730 may further generate model data (e.g., 2D and 3D model data) for use by other elements of system 700 or that can be stored in object library 720. The one or more object modeling systems 730 may be configured to allow a user to associate additional information, metadata, color, lighting, rigging, controls, or the like, with all or a portion of the generated model data.

The one or more object articulation systems 740 can include hardware and/or software elements configured to articulating one or more computer-generated objects. Articulation can include the building or creation of rigs, the rigging of an object, and the editing of rigging. In various embodiments, the one or more articulation systems 740 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 740 may further generate articulation data (e.g., data associated with controls or animations variables) for use by other elements of system 700 or that can be stored in object library 720. The one or more object articulation systems 740 may be configured to allow a user to associate additional information, metadata, color, lighting, rigging, controls, or the like, with all or a portion of the generated articulation data.

The one or more object animation systems 750 can include hardware and/or software elements configured for animating one or more computer-generated objects. Animation can include the specification of motion and position of an object over time. The one or more object animation systems 750 may be invoked by or used directly by a user of the one or more design computers 710 and/or automatically invoked by or used by one or more processes associated with the one or more design computers 710.

In various embodiments, the one or more animation systems 750 may be configured to enable users to manipulate controls or animation variables or utilized character rigging to specify one or more key frames of animation sequence. The one or more animation systems 750 generate intermediary frames based on the one or more key frames. In some embodiments, the one or more animation systems 750 may be configured to enable users to specify animation cues, paths, or the like according to one or more predefined sequences. The one or more animation systems 750 generate frames of the animation based on the animation cues or paths. In further embodiments, the one or more animation systems 750 may be configured to enable users to define animations using one or more animation languages, morphs, deformations, or the like.

The one or more object animations systems 750 may further generate animation data (e.g., inputs associated with controls or animations variables) for use by other elements of system 700 or that can be stored in object library 720. The one or more object animations systems 750 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 760 may be invoked by or used directly by a user of the one or more design computers 710 and/or automatically invoked by or used by one or more processes associated with the one or more design computers 710.

In various embodiments, the one or more object simulation systems 760 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 760 may be used to simulate the behavior of objects, such as hair, fur, and cloth, in response to a physics model and/or animation of one or more characters and objects within a computer-generated scene.

The one or more object simulation systems 760 may further generate simulation data (e.g., motion and position of an object over time) for use by other elements of system 100 or that can be stored in object library 720. The generated simulation data may be combined with or used in addition to animation data generated by the one or more object animation systems 150. The one or more object simulation systems 760 may be configured to allow a user to associate additional information, metadata, color, lighting, rigging, controls, or the like, with all or a portion of the generated simulation data.

The one or more object rendering systems 770 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 770 may be invoked by or used directly by a user of the one or more design computers 710 and/or automatically invoked by or used by one or more processes associated with the one or more design computers 710. One example of a software program embodied as the one or more object rendering systems 770 can include PhotoRealistic RenderMan, or PRMan, produced by Pixar Animations Studios of Emeryville, Calif.

In various embodiments, the one or more object rendering systems 770 can be configured to render one or more objects to produce one or more computer-generated images or a set of images over time that provide an animation. The one or more object rendering systems 770 may generate digital images or raster graphics images.

In various embodiments, a rendered image can be understood in terms of a number of visible features. Some examples of visible features that may be considered by the one or more object rendering systems 770 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 770 may further render images (e.g., motion and position of an object over time) for use by other elements of system 700 or that can be stored in object library 720. The one or more object rendering systems 770 may be configured to allow a user to associate additional information or metadata with all or a portion of the rendered image.

Figure 8:
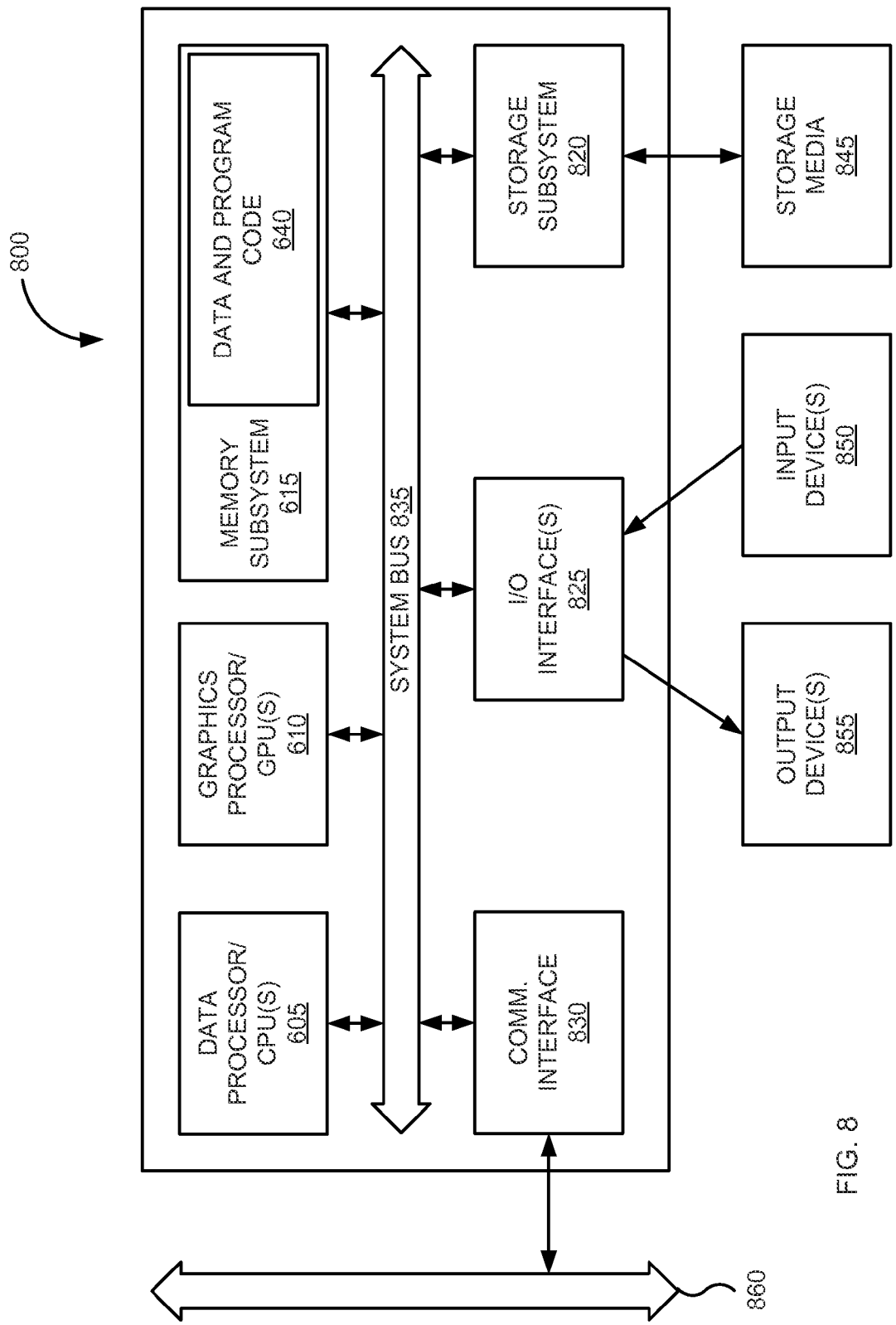
FIG. 8 is a block diagram of a computer system that may be used to practice various embodiments.

FIG. 8 is a block diagram of computer system 800. FIG. 8 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 800 and any of its components or subsystems can include hardware and/or software elements configured for performing methods described herein.

Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity and inter-device communication.

The one or more data processors or central processing units (CPUs) 805 can execute logic or program code or for providing application-specific functionality. Some examples of CPU(s) 805 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip or multiple processing units on a single circuit board or networked.

The one or more graphics processor or graphical processing units (GPUs) 810 can execute logic or program code associated with graphics or for providing graphics-specific functionality. GPUs 810 may include any conventional graphics processing unit, such as those provided by conventional video cards. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like.

Memory subsystem 815 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 815 can include data and program code 840.

Storage subsystem 820 can also store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data and program code 840 may be stored using storage subsystem 820.

The one or more input/output (I/O) interfaces 825 can perform I/O operations. One or more input devices 850 and/or one or more output devices 855 may be communicatively coupled to the one or more I/O interfaces 825. The one or more input devices 850 can receive information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can output information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements. A display device or monitor may be used with computer system 800 and can include hardware and/or software elements configured for displaying information.

Communications interface 830 can perform communications operations, including sending and receiving data. Some examples of communications interface 830 may include a network communications interface (e.g. Ethernet, Wi-Fi, etc.). For example, communications interface 830 may be coupled to communications network/external bus 860, such as a computer network, a USB hub, or the like. A computer system can include a plurality of the same components or subsystems, e.g., connected together by communications interface 830 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 800 may also include one or more applications (e.g., software components or functions) to be executed by a processor to execute, perform, or otherwise implement techniques disclosed herein. These applications may be embodied as data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A computer-implemented method of updating an animation model, the method comprising:
   receiving the animation model in a computer, wherein the animation model comprises:
     an object comprising a plurality of components, wherein the components are organized according to a hierarchical relationship, and
     a plurality of solvers, wherein each solver is associated with a component of the object; and
     a plurality of switches, wherein each switch is associated with a respective solver, and wherein each switch is associated with a respective list of hierarchical dependencies to other switches;
   providing a user interface for selecting a solver to use in updating a first pose of the object in the animation model;
   receiving, through the user interface, a selection of a first solver to use in updating the first pose of the object, wherein the first solver is associated with a first component of the object, and wherein a first switch is associated with the first solver;

determining an initial first state of the first component;
setting a first configuration of the first solver by activating the first switch, wherein when a first status of the first switch is activated, the first solver is configured to determine a subsequent first state of the first component;
in response to the selection of the first solver and the activation of the first switch:
   automatically identifying, by the computer, a second switch associated with a second solver, wherein the second switch is associated with the first switch based on a first list of hierarchical dependencies;
   automatically setting, by the computer using one or more predetermined rules, a second status of the second switch based on the first status of the first switch; and
   setting, by the computer, a second-configuration of the second solver based on the second status of the second switch; and
automatically updating the animation model, including the first pose of the object, using at least the first solver, wherein the animation model is updated based on the first configuration of the first solver and the second configuration of the second solver.

2. The method of claim 1, the method further comprising:
identifying a third switch associated with a third solver in a second list of hierarchical dependencies associated with the second switch;
specifying a third status of the third switch based on the second status of the second switch and the one or more predetermined rules;
setting a third configuration of the third solver based on the second status of the second switch; and
updating the animation model based on the first list and second list of dependencies.

3. The method of claim 2, further comprising:
receiving an alternative third status of the third switch of the third solver based on an alternative list of hierarchical dependencies for a switch other than the second switch;
determining whether the third status of the third switch and the alternative third status of the third switch are the same.

4. The method of claim 3, further comprising:
when the third status of the third switch and the alternative third status of the third switch are different, ignoring the predetermined rules for specifying statuses of switches in response to the activation of the first switch.

5. The method of claim 1, further comprising:
receiving, through the user interface, the subsequent first state of the first component of the object; and
automatically updating the second status of the second switch based on the one or more predetermined rules.

6. The method of claim 1, wherein the second solver corresponds to a second component of the object, the method further comprising:
determining the second status of the second switch;
deactivating the second status of the second switch based on the one or more predetermined rules, wherein when the second status of the second switch is deactivated, the first solver is configured to determine a second state of the second component;
determining the second state of the second component using the first solver; and
updating the animation model, including the first pose of the object, using the second state of the second component.

7. The method of claim 1, wherein the second solver corresponds to a second component of the object, the method further comprising:
determining the second status of the second switch;
activating the second status of the second switch based on the one or more predetermined rules, wherein when the second status of the second switch is activated, the first solver and the second solver are configured to determine a second state of the second component;
updating the second configuration of the second solver;
determining the second state of the second component using the first solver and the second solver; and
updating the animation model, including the first pose of the object, using the second state of the second component.

8. The method of claim 1, wherein the object is a first object and the second solver corresponds to a second object, the method further comprising at least:
identifying the second object and a second pose of the second object;
determining the second status of the second switch;
deactivating the second status of the second switch based on the one or more predetermined rules, wherein when the second status of the second switch is deactivated, the first solver is configured to determine a second state of the second object;
determining the second state of the second object using the first solver; and
updating the animation model, including the first pose of the first object and the second pose of the second object, using the second state of the second object.

9. The method of claim 1, wherein the object is a first object and the second solver corresponds to a second object, the method further comprising at least:
identifying the second object and a second pose of the second object;
determining the second status of the second switch;
activating the second status of the second switch based on the one or more predetermined rules, wherein when the second status of the second switch is activated, the second solver is configured to determine a second state of the second object;
updating the second configuration of the second solver;
determining the second state of the second object using the second solver in the updated second configuration; and
updating the animation model, including the first pose of the first object and the second pose of the second object, using the first solver and the second solver, wherein the updated animation model is based on the second state of the second object.

10. The method of claim 1, wherein the second configuration of the second solver includes motion and luminescence.

11. The method of claim 9, wherein the second configuration of the second solver and the first configuration of the first solver are saved.

12. The method of claim 11 wherein setting the first configuration of the first solver includes applying the saved first configuration of the first solver.

13. The method of claim 1, wherein identifying the second switch associated with the first switch based on the first list of hierarchical dependencies associated with the first switch includes at least:
determining one or more predetermined criteria based on the one or more predetermined rules;
determining whether one or more predetermined criteria are satisfied;

when one or more of the predetermined criteria are satisfied, determining that the second switch is associated with the first switch; and when one or more of the predetermined criteria are not satisfied, determining that the second status of the second switch is independent of the first status of the first switch.

14. The method of claim 13, wherein the association is that the second switch and the first switch are mutually exclusive.

15. The method of claim 13, wherein the association is that the second switch and the first switch are not mutually exclusive.

16. The method of claim 13, wherein the one or more predetermined criteria includes at least: an environment of the object, the animation model, or a type of solver.

17. The method of claim 16, further comprising saving the first list of hierarchical dependencies associated with the first switch, including the one or more predetermined rules and the one or more predetermined criteria.

18. The method of claim 1 wherein at least one of the one or more of the predetermined rules are defined by a user.

19. A computer product comprising a non-transitory computer readable medium storing a plurality of instructions, that when executed on one or more processors of a computer system, perform:

receiving an animation model in a computer, wherein the animation model comprises:
an object comprising a plurality of components, wherein the components are organized according to a hierarchical relationship, and
a plurality of solvers, wherein each solver is associated with a component of the object; and
a plurality of switches, wherein each switch is associated with a respective solver, and wherein each switch is associated with a respective list of hierarchical dependencies to other switches;

providing a user interface for selecting a solver to use in updating a first-pose of the object in the animation model;

receiving, through the user interface, a selection of a first solver to use in updating the first pose of the object, wherein the first solver is associated with a first component of the object, and wherein a first switch is associated with the first solver;

determining an initial first state of the first component;

setting a first configuration of the first solver by activating the first switch, wherein when a first status of the first switch is activated, the first solver is configured to determine a subsequent first state of the first component;

in response to the selection of the first solver and the activation of the first switch:
automatically identifying, by the computer, a second switch associated with a second solver, wherein the second switch is associated with the first switch based on a first list of hierarchical dependencies;
automatically setting, by the computer using one or more predetermined rules, a second status of the second switch based on the first status of the first switch; and
setting, by the computer, a second-configuration of the second solver based on the second status of the second switch; and automatically updating the animation model, including the first pose of the object, using at least the first solver, wherein the animation model is updated based on the first configuration of the first solver and the second configuration of the second solver.

20. The computer product of claim 19, wherein identifying the second switch associated with the first switch based on the first list of hierarchical dependencies associated with the first switch includes at least:

determining one or more predetermined criteria based on the one or more predetermined rules;

determining whether one or more predetermined criteria are satisfied;

when one or more of the predetermined criteria are satisfied, determining that the second switch is associated with the first switch; and when one or more of the predetermined criteria are not satisfied, determining that the second status of the second switch is independent of the first status of the first switch.

* * * * *